Patented Mar. 7, 1950

2,499,914

UNITED STATES PATENT OFFICE 2,499,914

PROCESS FOR EXTRACTING BIOCHEMICALLY ACTIVE SUBSTANCES FROM GRAIN AND THE LIKE, AND PRODUCT PREPARED THEREBY

Alan R. Graff, Chicago, Ill.

No Drawing. Application October 1, 1945,
Serial No. 619,700

6 Claims. (Cl. 195—66)

This invention relates to a new and useful process through the utilization of which there may be obtained from various substances, such as malt, grains, and the like, biochemically active materials, such for instance as diastase, which have potencies substantially higher than extracts of such types theretofore known or produced. This process further is productive of high yields and of a finished product in the form of a clean powder having high commercial utility and value.

The process of this invention has the further advantage of readily lending itself to commercial scale industrial operations for the production of said biochemically active materials, and of providing a simplified and improved method of treating raw materials from which the desired products are obtained.

This invention also relates to a new and improved diastatic product, extracted according to the process herein disclosed.

In the past, efforts have been made to extract from organic materials various biochemically active substances, such as, for example, enzymes. Various organic materials, such as malt, cereal grains, papaya, pineapple, "mold-bran," bacterial cultures, animal tissues, animal organs, animal sera, animal secretions, and the like, have been employed as raw materials for this purpose. As far as this applicant knows, however, extracts of this type have had only a limited potency and in all instances have required an extraction technique and procedure which has rendered such products quite expensive. Furthermore, prior efforts to extract substances, such as diastase, from malt by mashing the material treated with water and thereafter precipitating the diastase, have been productive of a brown and gummy mass which cannot be readily filtered and which during the handling will often turn a dark brown color and otherwise deteriorate to a degree productive only of a product having lower diastatic potency than is consistently obtainable by the process constituting this invention.

According to the present invention, a relatively pure, clean powder is obtained which has a potency substantially greater than diastatic enzymes or enzyme concentrates now available on the market or referred to in the literature, as far as this applicant is aware. For purposes of this comparison, reference is here made to the standard method of diastatic power determination according to Lintner, as adapted by the American Society of Brewing Chemists and published in the A. S. B. C. "Methods of Analysis."

A further advantage of the present invention resides in the fact that good yield of the final product consistently may be produced.

The practice of this invention involves two steps, the first of which is a suitable extraction step. A highly improved product, insofar as its biochemical activity is concerned, is produced when a water solution of the active substance is selectively treated with a precipitating agent, whereby the precipitation occurs within a predetermined and desired range of concentration of the precipitating agent, to the end that certain wanted substances may be selectively precipitated.

The second step of this invention is based on the discovery that the precipitate produced as above suggested, and separated from the filtrate should next be treated with a substance which is here referred to as a dehydrating agent, or, in non-technical terms free from theoretical implication, a substance which will act to convert the extracted and flocculated material from a gummy mass containing impurities productive of relatively low potency products, into a non-gumming precipitate which can be readily handled and separated from unwanted impurities, and which is productive of a clean product of exceptionally high potency and value.

Considering now the first step, it is well known, for instance, that substances such as diastase may be obtained by first mashing the desired quantity of malt in water and, after dissolving the diastase, separating the grains from the filtrate and, finally, throwing down the diastase with a precipitating agent such as ethyl alcohol, isopropyl alcohol, acetone, or equivalent agent capable of precipitating proteins, without harmful destruction of the diastase. When following this procedure, however, this applicant found that the higher the concentration of precipitating agent the greater will be the quantity of precipitate thrown down. In other words, when the precipitation is carried to the point of producing the maximum yield, substances are thrown down which are not diastatically potent to the same degree as are the substances precipitated within 2 proper ranges of concentrations of the precipitating agent. Furthermore, it now has been demonstrated that among these low potency substances are substances harmful to the enzymes precipitated. Consequently, a procedure of selective precipitation will avoid the production of products which do not have the stability, potency, and diastatic power characteristic of the product produced at properly selected concentrations, although the larger yields obtainable at higher or lower concentrations will not be realized.

In considering the above, it should be understood that the "maximum yield" of alcohol-insoluble protein bodies will presumably be obtained only when an infinite quantity of alcohol has been added to an aqueous infusion so as to produce a theoretical alcohol concentration of 100%.

By way of illustration, it has been found that the diastatic power expressed in degrees Lintner for precipitates produced according to this invention, that is to say, by selective step-by-step precipitating procedure, is substantially as follows: A product produced by 40% isopropyl alcohol content in the diastase filtrate was found by test to have a diastatic power of 2500° Lintner. After the product so produced was separated from its filtrate and the filtrate subjected to a further precipitation by the action of isopropyl alcohol in quantity sufficient to produce a final concentration of 50%, the precipitate thus thrown down was found by test to have a diastatic power of approximately 5400° Lintner. After separating this second precipitate, the filtrate was again treated for a further precipitation through the action of isopropyl alcohol. This time the concentration was adjusted to 60% and as a result the precipitate so produced was found to have a still higher diastatic power, namely, approximately 6200° Lintner. Thereafter, further successive steps of selective precipitation were carried out on the filtrate, but the potency, instead of further increasing, gradually dropped off somewhat until the alcohol concentration reached approximately 70%, after which the potency fell off markedly and rapidly as the alcoholic concentration increased.

At all times, however, as the concentration of the precipitating agent went up, the total volume of yield of precipitated substance went up substantially the same rate or at a rate indicated by a substantially straight line curve. For instance, if the yield by weight of the precipitate effected by a 40% alcohol solution should be expressed as 15, the yield at 50% concentration would be approximately 22; and at 60% concentration approximately 28; and at 70% concentration approximately 36; and at 80% concentration approximately 47.

This practice as applied to the extraction of diastase of malt and other biochemically active substances provides an understanding of the action of the precipitating agent at various concentrations upon two properties affected thereby, namely, diastatic potency expressed in degrees Lintner on the one hand, and yield on the other. If potency is not the determining factor, this discovery dictates the practice of increasing the concentration of the precipitating agent to the economic maximum, as to do so is to produce the highest possible yield. On the other hand, where potency is important as well as yield, this discovery dictates the practice, for example, as applied to the extraction of diastase from malt by the precipitating action of alcohol, of employing an alcohol concentration of not greater than approximately 70% of the water and alcohol mixture. In other words, the precipitating alcohol should not be added in quantity greater than the amount which will produce a liquid mass containing 70% alcohol. At approximately 70% the greatest possible yield of high potency diastase is thrown down while at the same time other possible unwanted and materially less potent substances remain in solution and are carried away with the filtrate. This is highly desirable because the other possible substances in the filtrate, according to the teachings herein set forth, are of such relatively low diastatic potency that they would act primarily as adulterants diminishing the strength of the final diastatic product. Also, the elimination of the "unwanted substances," which undoubtedly include oxidative enzymes such as, if retained, would contribute to instability and destruction of the desired product, is an important feature in the production of a high degree of purity. At some possible sacrifice in simplicity of the process an additional step may be introduced. Material precipitated from the original aqueous infusion at low concentrations of the precipitating agent, as, for example, 25% isopropanol, may be separated from the alcoholic solution before further material, containing higher proportions of the desired product is precipitated by increased concentration of the precipitating agent in the solution. Since these methods establish conditions which provide for the free, rapid and substantially complete separation of the precipitate from the mother-liquor, it is apparent that increased stability and purity in the final product is realized.

Proceeding now to the second step of the process, it should be borne in mind that after the highest possible yield of the greatest potency product is produced, the recovery of a good product requires that the precipitate be separated from the associated mother-liquor without destroying or materially impairing the product so recovered and without diminishing its potency, and according to procedure which will avoid the formation of a gummy mass which cannot be filtered, dried, and recovered without browning and deterioration. Applicant now has discovered that the precipitate produced according to the first step of the process should be next separated from the mixture of water and precipitating agent by a suitable procedure such as by settling and decanting, or by centrifuging, or by any other satisfactory method. Of course, the product cannot be brought to a completely dried state by decanting or centrifuging, as some residual mother-liquor remains. The product in this stage is usually a thick slurry. It is the final drying of this wet product that presents a serious problem and toward which the second step of this process is directed. For instance, if the removal of liquid for the purpose of drying the product is undertaken by filtering, it is found that the white flocculent extract which is produced according to the first step of this process forms a gummy mass on the filter which clogs the filter and defeats any effort cleanly to separate the filter cake from the mother-liquor, notwithstanding the utilization of strong suction on the filters. Furthermore, the prolonged filtering treatment which results causes an exposure of the product to the atmosphere while the product is moist with mother-liquor, which browns the product and materially reduces its potency.

No method heretofore has been devised, as far as this applicant knows, by which the gummy precipitate referred to can be satisfactorily filtered or recovered without loss of potency and unwanted browning.

However, according to this invention, it has been discovered that after the bulk of the liquid has been removed from the precipitate it thereafter should be thoroughly treated with a suitable dehydrating agent, such as a suitable alcohol or acetone. In practice, relatively large volumes of the dehydrating agent may be added to the concentrated slurry, and subsequently removed by decanting or centrifuging, and additions and extractions repeated if desired until the product has been sufficiently dehydrated or "hardened" to enable it to be readily filtered without gumming the filter or turning brown.

According to another procedure, the precipitate, or concentrated slurry may have the desired quantity of "dehydrating" agent added and thoroughly stirred in, and thereafter the product may be filtered with or without a subsequent washing of the precipitate on the filter with a dehydrating agent. Whatever procedure may be adopted, it is found that the action of suitable dehydrating agents is that of converting the precipitate from a gummy mass, into what appears to be a true precipitate which does not clog the filter, is stable, and resists browning and loss of potency.

The objective of the dehydrating step is that of dehydrating the product rapidly and while avoiding any substantial degree of exposure of the product to the atmosphere or oxygen while the same remains in the presence of moisture and harmful substances contained in the mother-liquor. Whatever the action may be, it is found that the final product, produced according to the second step of this invention, is a substantially pure, white powder which is obtainable with the maximum yield for the potency level selected. As already pointed out, the potency may be varied as desired. In some cases the yield may be increased with a predetermined loss of potency and, conversely, the potency may be maintained at the highest possible level with the attendant sacrifice in yield. Further, by varying the concentration range in selective precipitation, the relative proportions of active components in the precipitate may be altered. For example, emphasis can be given to starch—liquifying or dextrinizing power, or both, or saccharifying power, or proteolytic power, and so on.

However, in all instances, according to the selective precipitation effected resulting from the first step of this process, the kind of product desired having the characteristic and potency-yield ratio selected may be produced, and thereafter, according to the second step, the product consistently may be recovered as a relatively pure white powder having high potency and commercial value.

Purely by way of illustration, the following examples may be referred to as procedures which may be employed to carry into practice the teachings of the present invention.

In the following examples, the steps of preparing the desired concentrated, powdery, biochemically active product have been separated into two groups of operations. The first group includes methods of preparing aqueous, substantially clear solutions or filtrates containing the desired biochemically active substance, such as, for example, an enzyme, in the dissolved or colloidally suspended filtered state, and the second group includes methods of treating the said aqueous extracts, infusions or solutions of biochemically active substances to obtain the desired dry, solid, concentrated, biochemically active products.

Methods of producing aqueous biochemically active solutions are numerous and well known. However, this invention relates to methods of treating or operating upon such aqueous solutions, in order to obtain the desired biochemically active substance, such as, for example, an enzyme, in the form of a dry, stable solid, which is concentrated and in a purified form. Listed below are several alternative procedures utilizing different raw materials and by which aqueous extracts, infusions, or solutions of the above biochemically active substances, such as enzymes, may be obtained.

It should be understood that in the above reference to "aqueous" solutions, it is intended to include in addition to water, extracting media consisting of water and a quantity of alcohol, isopropyl alcohol, ammonium sulphate, or other protein-precipitating agent. In such cases the non-aqueous portion of the media is so adjusted that it serves to limit the solubility of unwanted protein bodies present in the original raw material while at the same time it does not prevent the desired protein-bodies and associated biochemically-active substances from dissolving in the aqueous liquid extracting medium.

EXAMPLES OF METHODS OF PREPARING BIOCHEMICALLY ACTIVE AQUEOUS EXTRACTS OR SOLUTIONS

1. Malt as a raw material

Twenty pounds of barley malt, such as commercial barley malt of the type known as "distillers" malt, are ground to a fineness comparable to that used in a distillery mash. The ground malt is mashed with ten gallons of tap water at 30° C. for one hour. The mash is filtered with the aid of suction. Just before the filtration has become nearly complete, the solids remaining on the filter are sprayed or "sparged" with one gallon of water to promote more complete removal of the available biochemically active substances from the filter cake. The filtration proceeds for about two hours (depending on the efficiency of the filter and the characteristics of the malt). The clear filtrate, which has a volume of 9–10 gallons, is then transferred to a suitable container preparatory to treatment for isolation of the desired final solid product by methods which will be described below.

2. Mold cultures or mold-enriched substrates as raw materials (a) A "mold-bran" or "koji" obtained by culturing *Aspergillus oryzae* or other suitable mold on wheat bran or other suitable substrate, may be used as a raw material source of biochemically active products, such as enzymes. A suitable method for preparing one such raw material, rich in diastatic (amylolytic) enzymes, is outlined in a paper by Hao, Fulmer and Underkofler, J. Indust. Eng. Chem., vol. 36, pp. 814–818 (1943).

The dried enzyme-enriched "mold-bran" or similar culture of a suitable mold known to produce a desired biochemically active substance, such as an enzyme, when grown on a suitable substrate such as wheat bran, is ground to a suitable fineness for mashing with water. A laboratory size "Seck" mill, such as is standard equipment in malt and brewery laboratories, has been employed for this purpose.

Twenty pounds of the ground, dried raw material as described above are mashed with ten gallons of tap water at 30° C. for one hour. The mash is filtered with the aid of suction. Just before the termination of the filtration the solids remaining on the filter are sprayed or "sparged" with one gallon of water to promote more complete removal of available biochemically active substances from the filter cake. The filtration proceeds for about two hours (depending on the efficiency of the filter and the character of the solid material). The clear filtrate, comprising 9–10 gallons, is then transferred to a suitable container preparatory to treatment for isolation of the desired final solid product by methods to be described below.

(b) A liquid culture of *Aspergillus oryzae* or other suitable mold known to produce a desired biochemically active substance such as an enzyme, may be employed as a raw material.

A slurry or thick mycelial suspension of *Aspergillus oryzae* in liquid medium may be prepared by "deep culture" methods or by any other suitable and known procedure.

The mycelial slurry is filtered with the aid of suction and, if desired, sparged to promote recovery in the filtrate of the greatest possible proportion of the water-soluble biochemically active substance sought, which has been excreted by the growing mold. The aqueous filtrate described above is placed in a suitable container for subsequent treatment for recovery of the dried, solid, concentrated, biochemically active product desired, such as an enzyme, by methods to be described below.

3. Bacterial cultures as raw materials

Cultures of *Bacillus subtilis* or *B. mesentericus*, or of other suitable micro-organisms may be employed as raw materials. From such cultures clear or substantially clear, biochemically active, aqueous filtrates or centrifuged solutions may be obtained by a number of methods which will occur to those skilled in the art. For example, one method is as follows:

Brewery "first wort" having a specific gravity of 18–19 degrees on Balling's scale is used as a raw material. It is diluted with tap water to specific gravity 12° Balling. Sufficient ammonium phosphate, calcium sulphate and dextrose are added to adjust the constituents named below to the specified levels:

| | |
|---|---|
| Fermentable sugars | 6% minimum |
| $N_2$ | 1200 P. P. M. |
| Ca | 250 P. P. M. |
| $PO_4$ | 500 P. P. M. |

The substrate thus treated is sterilized and pH raised to 6.6–6.8 by the aseptic addition of caustic soda solution. It is inoculated with *Bacillus subtilis* (*Bacillus mesentericus* has been successfully employed on a parallel experiment) and allowed to incubate at 30° C. in containers where the liquid height is not over 15 mm. After four days the enzyme-enriched culture suspension is centrifuged and the clear supernatant liquor decanted. This liquor or solution containing biochemically active substances is placed in a suitable container for subsequent treatment, by methods described below, for the isolation of an enzyme-rich, stable, solid powdered concentrate.

4. Preparations of animal origin as raw materials

Animal tissues containing desired biochemically active substances, such as enzymes, may be employed. Packing house products such as pancreas glands, gastric mucosa, etc., may be used as raw materials for the preparation of aqueous solutions of biochemically active substances such as enzymes, to which subsequent treatment may be applied by the methods subject of this invention for the isolation in dry, solid, stable, concentrated form of the desired biochemically active substances. For example, powdered pancreatic amylase may be prepared from clarified aqueous extracts of pancreatic tissue.

These examples are given, by way of illustration, as methods for obtaining clear or substantially clear aqueous solutions or colloidal suspensions of biochemically active substances, such as enzymes—of obtaining such aqueous solutions in a form suitable for treatment according to the methods of the invention described below.

An aqueous filtrate or substantially clear solution containing dissolved or colloidally suspended, biochemically active substances may be treated according to the methods of this invention, as follows:

METHODS OF PRODUCING STABLE AND SOLID OR POWDERY BIOCHEMICALLY ACTIVE PRODUCTS FROM INFUSIONS OR SOLUTIONS

Example 1

To 10 gallons of a filtered malt infusion or aqueous solution of malt diastase prepared as described above, are added 20 gallons of cold 99% isopropyl alcohol with vigorous stirring. If attempts are made to filter the obtained slurry at this point it will be found that the precipitate quickly clogs the filter-paper, filter-cloth, or other filter-medium, practically stopping the filtration, and that the filter-cake has a gummy consistency, browns rapidly on exposure to the air, and may exhibit a marked lack of stability during subsequent attempts to dry it. This gummy cake is, furthermore, extremely difficult to handle in commercial scale apparatus.

The mixture is allowed to stand for about four days at a temperature of around 40° F. The length of time of standing may be varied within wide limits, without appreciable loss either of yield or potency of the product. The object of standing is to promote settling of the suspension and concentration of the precipitated solid material as a thick slurry. The clear supernatant liquor is siphoned off leaving a thick but flowable slurry, which has a volume of approximately one gallon, and which is then mixed with three gallons of cold 99% isopropyl alcohol.

The proportion of 99% isopropyl alcohol added at this point may be varied. The object of this addition, which is one of the outstanding features of this invention, is to change the character of the precipitated solids from that of a suspension which gives a gummy filter cake on filtration, to a suspension which gives a powdery, clean, granular and freely-filtering filter cake, readily separable from its associated mother-liquor. The amount of 99% isopropyl alcohol or other suitable agent required properly to effect this alteration of the character of the precipitate will vary with the raw material used and with the methods of preparation of the original aqueous solution described above, as well as with the scale of operations, specific design of engineering equipment used, details of manipulation, etc. The resulting diluted or treated slurry may be circulated through a colloid mill for ten minutes and immediately filtered by suction.

Granular, freely-filtering filter cakes can be obtained without the use of a colloid mill for promoting dispersion of the suspended flocs of the treated slurry. The use of a colloid mill, however, is of some assistance in assuring a uniformity in the character of the filter cake as produced from a series of batches as well as uniform yields and potencies in the final product. The use of the colloid mill or other suitable means of promoting the dispersion and/or disintegration of the flocs or micelles of the precipitated solid in the slurry are contemplated in connection with the practices of this invention.

The filter cake may be washed on the filter with additional proportions of isopropanol. The substantially dry filter cake may be spread on paper or on a porous plate for drying. It may be dried at room temperature or at slightly elevated temperatures, sufficiently low to avoid injury to the biochemically active product in question. The final, dry powder may be ball-milled for 30 minutes and screened through a 100-mesh sieve. The yield from 20 pounds of the original dry barley malt having a diastatic power of 160° Lintner is from 1% to 3% of a product having a diastatic power in degrees Lintner of 4500 to 6000.

*Example 2*

Conduct the same as Example 1, except use ethanol, acetone, or diacetone alcohol in place of 99% isopropyl alcohol.

*Example 3*

To 10 gallons of an aqueous malt infusion or clear filtrate obtained from 20 pounds of barley malt as described above, are added 20 gallons of 99% isopropyl alcohol and the slurry obtained is stirred vigorously. It is then passed through a laboratory model Sharples centrifuge. Rates of feed of slurry to this type of centrifuge have been employed up to 500 cc. per minute. The clear, supernatant effluent is discarded or returned to the solvent recovery process. The centrifuge cake is removed from the bowl and macerated with cold 99% isopropyl alcohol. As described under Example 1, the quantity or proportion of isopropanol, or other "dehydrating agent" used may be varied according to the exact nature of the original aqueous infusion, and according to other requirements. Applicant has found a proportion of isopropanol equal to twice or thrice the weight of the centrifuge cake to be suitable for this example, but higher or lower proportions may be used, provided such other proportions of the "dehydrating agent" are effective in altering the character of the precipitate to permit subsequent free filtration and yield a stable, granular or powdery product in the final drying. In treating the centrifuge cake with isopropanol, a mortar and pestle may be employed if necessary for completing the maceration or dispersion in 99% isopropyl alcohol of the suspension of centrifuge cake. The centrifugal operation is preferably carried out, however, using a technique which yields a thick, creamy slurry instead of a true "cake" having complete lack of fluidity. The resulting granular suspension is immediately filtered by suction and washed, if desired, with small portions of 99% isopropyl alcohol. The drying of the filter cake may be completed by spreading on a porous plate or on paper. Slightly elevated temperatures may be used if desired and if the proper care is taken not to reach temperatures which will cause decomposition of the product.

From the above examples, it will be noted that after precipitating the solids with low molecular weight alcohols or equivalent protein precipitating agents and discarding a part of the liquor, the liquor remaining in close association with the solid particles has its water content reduced to a point below approximately 15% of the liquid phase present if the same has not previously been so reduced. Whereas a water content as high as 15% is satisfactory, a percentage of between approximately 5% and 12% is preferred.

I claim:

1. The method of extracting and recovering clean, light-colored powdered diastatic enzyme extract having exceptionally high potency according to Lintner's test, from a mass of precipitated enzyme material and associated mother liquor, which comprises the steps of discarding while in liquid phase a portion of the mother liquor while retaining only an amount thereof sufficient to cause said precipitate to exist as a dispersable mass and to prevent said mass from setting up as a gum, and then dispersing said mass in a water-miscible liquid selected from the group consisting of alcohols and ketones, and thereby converting the liquid phase immediately surrounding the precipitated solid particles to one having a water content of not more than substantially 15%, and thereafter separating the precipitate from the remaining liquid phase.

2. The method of extracting and recovering clean, light-colored powdered diastatic enzyme extract having exceptionally high potency according to Lintner's test, from a mass of precipitated enzyme material and associated mother liquor, which comprises the steps of discarding while in liquid phase a portion of the mother liquor while retaining only an amount thereof sufficient to cause said precipitate to exist as a dispersable mass and to prevent said mass from setting up as a gum, and then dispersing said mass in a water-miscible liquid selected from the group consisting of alcohols and ketones, and thereby converting the liquid phase immediately surrounding the precipitated solid particles to one having a water content of not more than from approximately 5% to approximately 12%, and thereafter separating the precipitate from the remaining liquid phase.

3. The method of extracting and recovering clean, light-colored powdered diastatic enzyme extract having exceptionally high potency according to Lintner's test, from a mass of precipitated enzyme material and associated mother liquor, which comprises the steps of discarding while in a liquid phase substantially all of the mother liquor which is not intimately associated with the precipitated mass while retaining an amount thereof sufficient to prevent said mass from setting up as a gum, and then adding a water miscible liquid selected from the group consisting of alcohols and ketones, and thereby converting the liquid phase immediately surrounding the precipitated solid particles to one having a water content of not more than substantially 15%, and thereafter separating the precipitate from the remaining liquid phase.

4. The process of claim 1, further characterized in that separation of liquid phase and solids is accomplished by centrifugal action.

5. The process of claim 1, further characterized in that separation of liquid phase and solids is accomplished by decantation and filtration.

6. A clean, light-colored, powdered enzyme extract having high potency, produced according to the method defined in claim 1.

ALAN R. GRAFF.

REFERENCES CITED

The following references are of record in the file of this patent:

UNITED STATES PATENTS

| Number | Name | Date |
|---|---|---|
| 525,823 | Takamine | Sept. 11, 1894 |
| 1,611,700 | Waksman | Dec. 21, 1926 |
| 1,929,003 | Neugebauer | Oct. 3, 1933 |
| 1,990,505 | Wallerstein | Feb. 12, 1935 |
| 2,068,623 | Warburg | Jan. 19, 1937 |
| 2,406,624 | Neuberg et al. | Aug. 27, 1946 |